United States Patent
Lee

(10) Patent No.: US 11,963,044 B2
(45) Date of Patent: Apr. 16, 2024

(54) DATA TRANSMISSION/RECEPTION APPARATUS AND OPERATION METHOD FOR DATA TRANSMISSION/RECEPTION APPARATUS

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 222 days.

(21) Appl. No.: 16/759,408

(22) PCT Filed: Oct. 29, 2018

(86) PCT No.: PCT/KR2018/012898
§ 371 (c)(1),
(2) Date: Apr. 27, 2020

(87) PCT Pub. No.: WO2019/088614
PCT Pub. Date: May 9, 2019

(65) Prior Publication Data
US 2021/0377807 A1   Dec. 2, 2021

(30) Foreign Application Priority Data
Oct. 31, 2017   (KR) .................. 10-2017-0144179
Oct. 26, 2018   (KR) .................. 10-2018-0129107

(51) Int. Cl.
*H04W 28/24*   (2009.01)
*H04W 28/02*   (2009.01)
*H04W 28/12*   (2009.01)

(52) U.S. Cl.
CPC ....... *H04W 28/24* (2013.01); *H04W 28/0236* (2013.01); *H04W 28/12* (2013.01)

(58) Field of Classification Search
CPC .. H04W 28/24; H04W 28/0236; H04W 28/12
See application file for complete search history.

(56) References Cited

U.S. PATENT DOCUMENTS 7,058,728 B1 *   6/2006   Eklund ................... H04L 69/04
455/445
10,568,061 B1 *   2/2020   Park ...................... H04W 76/34
(Continued)

FOREIGN PATENT DOCUMENTS

CN   109392023 A  *   2/2019   ........ H04W 28/0252
CN   109548096 A  *   3/2019   ........ H04W 36/0011
(Continued)

OTHER PUBLICATIONS

Qualcomm Incorporated S2-171714 "23.501-AMF-SMF implications of optimal UPF placement" Mar. 27-31, 2017, Busan, South Korea.
(Continued)

*Primary Examiner* — Mehmood B. Khan
(74) *Attorney, Agent, or Firm* — KED & Associates LLP

(57) ABSTRACT

The present disclosure proposes a technology of, when a single data session based on communications between UPFs is controlled, reducing the number of signalings for data session control to reduce delays on the data session control, so that the requirements of a URLLS service supported in the 5G technology can be satisfied and the performance of the service performance can be supported.

9 Claims, 8 Drawing Sheets

(56) References Cited

U.S. PATENT DOCUMENTS

| | | | |
|---|---|---|---|
| 2002/0178236 A1* | 11/2002 | Patel | H04W 8/26 |
| | | | 709/250 |
| 2002/0199019 A1 | 12/2002 | Battin et al. | |
| 2005/0080890 A1 | 4/2005 | Yang et al. | |
| 2006/0072574 A1* | 4/2006 | Akahane | H04L 45/50 |
| | | | 370/428 |
| 2007/0110017 A1* | 5/2007 | Fulknier | H04L 45/60 |
| | | | 370/351 |
| 2011/0013525 A1* | 1/2011 | Breslau | H04L 43/18 |
| | | | 370/252 |
| 2012/0281704 A1* | 11/2012 | Butterworth | H04L 47/564 |
| | | | 370/474 |
| 2013/0089011 A1* | 4/2013 | Alapuranen | H04L 5/1484 |
| | | | 370/294 |
| 2014/0119241 A1 | 5/2014 | Jung | |
| 2015/0236935 A1* | 8/2015 | Bassett | H04L 41/14 |
| | | | 709/224 |
| 2015/0381707 A1* | 12/2015 | How | H04L 67/10 |
| | | | 709/208 |
| 2016/0381554 A1* | 12/2016 | Abe | H04W 4/80 |
| | | | 455/411 |
| 2018/0192471 A1* | 7/2018 | Li | H04W 16/04 |
| 2018/0199398 A1* | 7/2018 | Dao | H04L 41/342 |
| 2018/0241671 A1* | 8/2018 | Bosch | H04L 69/22 |
| 2019/0028920 A1* | 1/2019 | Pan | H04L 47/24 |
| 2019/0090298 A1* | 3/2019 | Abraham | H04W 76/27 |
| 2019/0253917 A1* | 8/2019 | Dao | H04M 15/00 |
| 2020/0112881 A1* | 4/2020 | Lu | H04W 36/12 |
| 2020/0120570 A1* | 4/2020 | Youn | H04W 76/11 |
| 2020/0128469 A1* | 4/2020 | Akhavain Mohammadi | |
| | | | H04L 45/50 |
| 2020/0374948 A1* | 11/2020 | Pan | H04L 41/5019 |

FOREIGN PATENT DOCUMENTS

| | | | | |
|---|---|---|---|---|
| DE | 102007044714 A1 * | 3/2009 | | H04L 47/10 |
| EP | 3772864 A1 * | 2/2021 | | H04W 36/0022 |
| JP | 09-186691 | 7/1997 | | |
| JP | 2007-529128 | 10/2007 | | |
| KR | 10-2003-0003010 | 1/2003 | | |
| KR | 10-0270836 | 4/2006 | | |
| KR | 10-2011-0028057 | 3/2011 | | |
| KR | 10-2014-0052632 | 5/2014 | | |
| KR | 10-1690239 | 12/2016 | | |
| RU | 2764259 C1 * | 1/2022 | | H04L 5/0098 |
| WO | WO-2018126535 A1 * | 7/2018 | | H04W 48/08 |
| WO | WO-2018128494 A1 * | 7/2018 | | H04W 28/0263 |
| WO | WO-2018171859 A1 * | 9/2018 | | H04L 67/16 |
| WO | WO-2018205154 A1 * | 11/2018 | | H04L 67/327 |
| WO | WO-2018224126 A1 * | 12/2018 | | H04L 67/32 |
| WO | WO-2019001109 A1 * | 1/2019 | | H04L 12/14 |
| WO | WO-2019031941 A1 * | 2/2019 | | H04W 28/02 |

OTHER PUBLICATIONS

3rd Generation partnership project "23502-100" (Sep. 2017).
Chinese Office Action dated Dec. 24, 2021 issued in Application No. 201880068519.X (English translation attached).
International Search Report dated Jan. 8, 2019 issued in Application No. PCT/KR2018/012898.
Korean Office Action dated Oct. 30, 2019 issued in Application No. 10-2018-0129107 (English translation attached).

* cited by examiner

DATA TRANSMISSION/RECEPTION APPARATUS AND OPERATION METHOD FOR DATA TRANSMISSION/RECEPTION APPARATUS

BACKGROUND OF THE INVENTION

1. Field of the Invention

The present disclosure relates to a technology of controlling a data session based on communications between multiple data transceivers (UPFs).

This application is a U.S. National Stage Application under 35 U.S.C. § 371 of PCT Application No. PCT/KR2018/012898, filed Oct. 29, 2018, which claims priority to Korean Patent Application Nos. 10-2017-0144179, filed on Oct. 31, 2017, and 10-2018-0129107, filed on Oct. 26, 2018, which is hereby incorporated by reference for all purposes as if fully set forth herein.

2. Description of the Prior Art

As communication service types and required transmission rates are diversified in an LTE communication system, it has been actively conducted to establish more LTE frequencies and evolve to a 5G communication system.

The 5G communication system is rapidly evolving, so that it accommodates as many terminals as possible on the basis of limited radio resources, and supports various service types such as enhanced Mobile Broadband (eMBB)/massive Machine-Type Communications (mMTC)/Ultra-Reliable and Low-Latency Communications (URLLC).

Particularly, 5G defines a network structure for supporting a terminal, a Base Station (BS) (access), a core, and a server in an end-to-end form.

Specifically, 5G defines a network structure where an area (control plane) having a control-signaling function is separated from an area (user plane) having a data transmission/reception function unlike conventional LTE (4G).

At this time, control nodes of the control plane according to 5G may be defined as an Access and Mobility Management Function (AMF) for controlling radio section access of the terminal, a Policy Control Function (PCF) for managing/controlling a policy of subscriber information, subscription service information for each subscriber, and payment, and a Session Management Function (SMF) for managing/controlling a session for using a data service for each terminal.

Further, a data node of the user plane according to 5G may be defined as a User Plane Function (UPF) which transmits and receives data between the terminal and the server over a data network (for example, the Internet) through a session with the terminal on the basis of the control of (link with) the SMF.

UPFs in the 5G technology have been researched and developed in ways such that the UPFs are weight-reduced significantly and virtualized to be commercialized and support URLLC service, and are thus expected to be separated from a core and located at several dispersed places (e.g. access end) in the future.

If UPFs are separated from a core and located at several dispersed places (e.g. access end), functions performed by the UPFs are divided. Thus it is expected that various service scenarios requiring for communications (interworking) between the UPFs can be provided and applied As a part of the various service scenarios, a service scenario of controlling (through, for example, creation and modification) a data session of a terminal on the basis of communications between a plurality of UPFs performing different divided functions is possible.

In the current 5G standard, in order to control a data session based on communications between a plurality of UPFs, a SMF is required to perform identical signaling for requesting (or ordering) data session control (e.g. creation and modification) to each of the plurality of UPFs by providing both identical data session information and identical service requirement information to each UPF.

That is, according to the current 5G standard, in order to control a data session based on communications between a plurality of UPFs, the number of signalings by a SMF can be numerous in proportion to the number of UPFs involved in one data session.

As described above, if the number of signalings for controlling one data session increases, delays on data session control occur inevitably, and the quality of URLLC service may degrade consequently.

However, the current 5G does not have a method for reducing delays on data session control, which occur by an SMF performing identical signaling to each of multiple UPFs involved in one data session.

Therefore, the present disclosure is to improve the conventional situation in which delays on data session control occur by an SMF performing identical signaling to each of multiple UPFs involved in one data session.

SUMMARY OF THE INVENTION

An aspect of the present disclosure is to implement a new method of reducing the number of signalings for data session control based on communications between a plurality of data transceivers (UPFs).

According to an embodiment of the present disclosure, a data transceiver includes: a session control unit configured to control a data session of a particular terminal in response to a request related to the data session, which is received from a control node; an information generation unit configured to, at the time of reception of the request, generate particular information defined as master operation information relating to the data session control; and a packet transfer unit configured to insert the particular information in a data packet received through the data session and then transfer the data packet to a particular slave data transceiver recognized from the master operation information, so as to allow the particular slave data transceiver to identically perform data session control for the particular terminal on the basis of the particular information in response to the request.

Specifically, the particular information may be included in a particular header of the data packet.

Specifically, the particular header may be defined in a particular interface defined for signaling between data transceivers.

Specifically, the packet transfer unit may be configured to: insert the particular header by modifying a header of the data packet into the particular header, or additionally insert the particular header in the header of data packet; and transfer the data packet through the particular interface to the particular slave data transceiver.

Specifically, the master operation information may include data session information of the data session according to the request, service requirement information including at least one of end-to-end information, a packet detection rule (PDR), a forwarding action rule (FAR), a QoS enforcement rule (QER), and a usage reporting rule (URR) of the data, and master and slave interconnection information.

Specifically, the particular slave data transceiver may be recognized to be directly connected to the data transceiver from the master and slave interconnection information.

Specifically, the particular header may include at least one of the data session information, the service requirement information, the master and slave interconnection information, and address information relating to a slave data transceiver recognized to be directly connected to the particular slave data transceiver from the master and slave interconnection information Specifically, the data transceiver may have a most excellent capability or may be closest to an access end of the particular terminal in a combination having a most excellent property in terms of expected service delays (latency and throughput), among combinations of data transceivers which can be connected with each other and involved in the data session of the particular terminal, on the basis of a location, an interconnectivity, and a capability of each data transceiver.

According to an embodiment, a data transceiver may include: a session control unit; and an information identification unit configured to, at the time of reception of a data packet from another data transceiver, identify particular information of the data packet, wherein the session control unit is configured to control a data session of a particular terminal on the basis of the particular information when there is no data session identical to that indicated by the particular information.

Specifically, the particular information may be included in a particular header of the data packet.

Specifically, the data packet may be received through a particular interface defined for signaling between data transceivers, and the particular header may be defined in the particular interface.

Specifically, the particular header of the received data packet may include at least one of data session information relating to the data session, service requirement information including at least one of data session information, end-to-end information, a packet detection rule (PDR), a forwarding action rule (FAR), a QoS enforcement rule (QER), and a usage reporting rule (URR) of the data session, master and slave interconnection information, and address information relating to a slave data transceiver recognized to be directly connected to the data transceiver from the master and slave interconnection information.

Specifically, the session control unit may be configured to: control a data session of the particular terminal in response to a request related to the data session, which is received from a control node; and when there is a data session related to information in the particular header, control the existing data session of the particular terminal on the basis of the information in the particular header, and wherein the particular header identified when the data session related to the information in the particular header exists includes information which is not included in the data session-related request from the control node among the data session information, the service requirement information, the master and slave interconnection information, and the address information.

Specifically, the data transceiver may further include: a slave identification unit configured to identify whether a slave data transceiver recognized to be directly connected to the data transceiver, on the basis of the information in the particular header; an information generation unit configured to, when the slave data transceiver is identified, modify the particular header of the data packet to transfer the modified particular header to the slave data transceiver; and a packet transfer unit configured to transfer the data packet having the modified particular header to the slave data transceiver.

Specifically, the packet transfer unit may be configured to transfer the received data packet to a data network when the slave data transceiver is not identified.

According to an embodiment of the present disclosure, an operation method of a data transceiver includes: a session control operation of controlling a data session of a particular terminal in response to a received request related to the data session; an information generation operation of, at the time of reception of the request, generating particular information defined as master operation information relating to the data session control; and a packet transfer operation of inserting the particular information in a data packet received through the data session from the particular terminal and then transferring the data packet to a particular slave data transceiver recognized from the master operation information.

According to an embodiment of the present disclosure, an operation method of a data transceiver includes: an information identification operation of, at the time of reception of a data packet from another data transceiver, identify particular information of the data packet; a session control operation of, when there is no data session of a particular terminal, which is identical to that indicated by the particular information, controlling a data session of the particular terminal on the basis of the particular information; a slave identification operation of, if a data session of a particular terminal, which is identical to that indicated by the particular information, exists, or is controlled in the session control operation, identify whether there is a slave data transceiver recognized to be directly connected to the data transceiver, on the basis of the particular information; and a packet transfer operation of, when the slave data transceiver is identified, modify a particular header of the data packet and then transfer the data packet to the slave data transceiver.

Specifically, the method may further include: controlling a data session of the particular terminal in response to a request related to the data session, which is received from a control node, wherein the session control operation includes: when there is a data session related to the particular information, controlling the existing data session of the particular terminal on the basis of the particular information, and wherein the particular information identified when a data session related to the particular information exists includes information which is not included in the data session-related request from the control node among the data session information, the service requirement information, the master and slave interconnection information, and the address information.

Embodiments of the present disclosure can achieve a new method (technology) of reducing the number of signalings for data session control based on communications between multiple data transceivers (UPFs).

Therefore, according to embodiments of the present disclosure, the number of signalings for data session control is reduced and thus delays on data session control are reduced, so that the requirements and performances of a service type supported in the 5G technology can be efficiently supported.

DETAILED DESCRIPTION OF THE EXEMPLARY EMBODIMENTS

Figure 1:
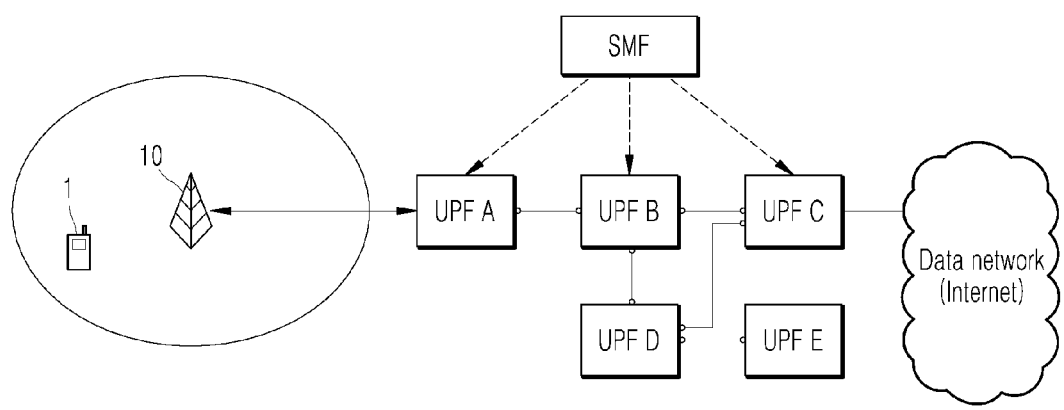
FIG. 1 is a diagram illustrating a conventional signaling environment for controlling a data session.

Hereinafter, embodiments of the present disclosure will be described with reference to the accompanying drawings.

The present disclosure relates to a technology of controlling a data session for a terminal.

Specifically, in the present disclosure, a future 5G communication system is considered.

A 5G communication system receives as many terminals as possible, based on limited wireless sources, and supports various service types such as enhanced mobile broadband (eMBB), massive machine type communications (mMTC), and ultra-reliable and low latency communications (URLLC).

Especially, in the 5G technology, a network structure for supporting a terminal, a base station (access), a core, and a server by end-to-end processes is defined.

Specifically, in the 5G technology, unlike the conventional LTE (4G), a network structure in which a control signaling function region (control plane) and a data transmission/reception function region (user plane) are distinguished is defined.

In the 5G technology, a control node in a control plane may be defined as an access and mobility management function (AMF) configured to control the access of a terminal to wireless sections, a policy control function (PCF) configured to manage and control a policy, such as subscriber information, subscriber-specific subscription information, and charge, and a session management function (SMF) configured to manage and control a session for the use of data service for each terminal.

In the 5G technology, a data node in a user plane may be defined as a user plane function (UPF) configured to transmit or receive data between a server in a data network (e.g. Internet) and a terminal through a session with the terminal on the basis of the controlling (interworking) of a SMF.

UPFs in the 5G technology have been researched and developed in ways such that the UPFs are weight-reduced significantly and virtualized to be commercialized and support URLLC service, and are thus expected to be separated from a core and located at several dispersed places (e.g. access end) in the future.

If UPFs are separated from a core and located at several dispersed places (e.g. access end), functions performed by the UPFs are divided and thus expected to allow the appearance and application of various service scenarios based on communications (interworking) between the UPFs.

A service scenario of controlling (through, for example, creation and modification) a data session of a terminal on the basis of communications between a plurality of UPFs performing different divided functions, respectively is possible as a part of the various service scenarios.

In the current 5G standard, in order to control a data session based on communications between a plurality of UPFs, a SMF is required to perform identical signaling requesting (or ordering) data session control (e.g. creation and modification) to each of the plurality of UPFs by providing both identical data session information and identical service requirement information to each UPF.

FIG. 1 illustrates a signaling environment in which a data session based on communications between multiple UPFs is controlled, according to the current 5G standard.

As illustrated in FIG. 1, when a data session creation event for terminal 1 occurs or a data session modification event for terminal 1 occurs, a SMF provides both identical data session information and identical service requirement information for data session control (e.g. creation and modification), to each of UPFs involved in a data session of terminal 1.

As described above, the SMF transmits an identical signal requesting (or ordering) data session control (e.g. creation and modification) to each of the UPFs involved in the data session of terminal 1 (the operation indicated by the dotted lines in FIG. 1).

For example, if there are UPF A, UPF B, and UPF C as UPFs involved in a data session of terminal 1, the SMF provides each of UPF A, UPF B, and UPF C with both identical data session information and identical service requirement information for data session control (e.g. creation and modification), thereby transmitting an identical signal requesting (or ordering) data session control (e.g. creation and modification) to each of UPF A, UPF B, and UPF C.

Each of UPF A, UPF B, and UPF C performs data session control (e.g. creation and modification) for terminal 1 on the basis of the data session information and the service requirement information in response to the request received from the SMF.

A data packet between terminal 1 and a server in a data network may be transmitted or received while an identical service requirement is applied to the data packet through the data session of terminal 1, passing through UPF A, UPF B, and UPF C.

As described above, according to the current 5G standard, in order to control a data session based on communications between a plurality of UPFs, the number of signalings by the SMF are required to be as numerous as the number of UPFs involved in one data session.

Further, a large number of signalings by the SMF causes severe delays on data session control because the speed of an N4 interface defined for signaling between the SMF and the UPFs is not fast and the physical distance between the SMF in a core and the UPFs occurs since the UPFs are separately located from the core.

Moreover, delays on data session control may cause the degradation of the quality of URLLC service.

In the future, as a technology of implementing significant weight reduction and virtualization of UPFs develops, it is expected that functions performed by the UPFs are further refined and divided and the number of UPFs involved in a single data session is increased. Therefore, according to the current 5G standard, the number of signalings by a SMF to control a data session based on communications between UPFs will increase more in the further.

Therefore, the current 5G may require a method of reducing delays on data session control, which occur by an SMF performing identical signaling to each of multiple UPFs involved in a single data session.

Accordingly, the present disclosure proposes a new method (hereinafter, a data session control technology on the basis of inter-UPF communications) by which delays on data session control, which occur by an SMF performing identical signaling to each of multiple UPFs involved in a single data session, can be reduced.

Specifically, the present disclosure proposes a data transceiver which implements a proposed data session control technology on the basis of inter-UPF communications.

Figure 2:
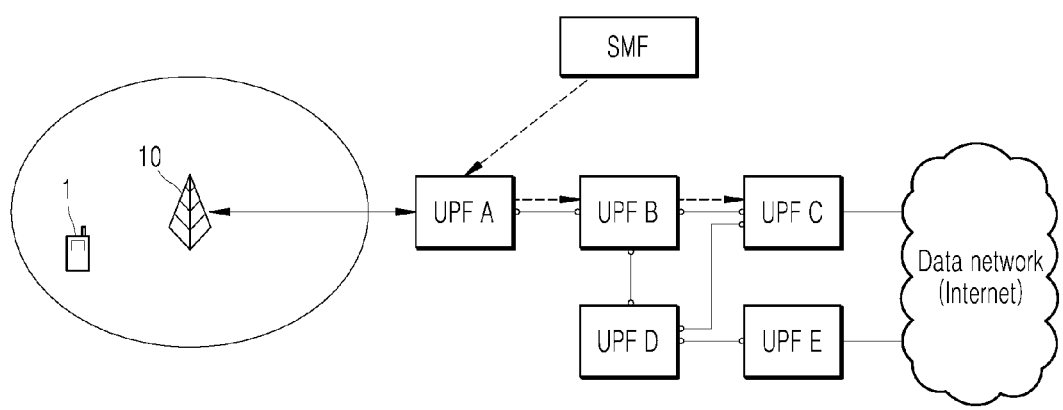
FIG. 2 is a diagram illustrating a signaling environment according to a new method proposed in the present disclosure.

FIG. 2 illustrates a signaling environment according to a data session control technology on the basis of inter-UPF communications, proposed in the present disclosure.

As illustrated in FIG. 2, a SMF is configured to, when a data session creation event for terminal 1 occurs or a data session modification event for terminal 1 occurs, transmit a signal requesting (or ordering) data session control (e.g. creation and modification) only to a master UPF selected among UPFs involved in a data session of terminal 1 (the operation indicated by the dotted lines).

In FIG. 2, UPF A, UPF B, and UPF C are assumed as UPFs involved in a data session of terminal 1, and UPF A is assumed as a master UPF.

Specifically, the SMF may provide UPF A, as a master UPF, with data session information and service requirement information for data session control (e.g. creation and modification), and master and slave interconnection information, thereby transmitting a signal (hereinafter, data session-related request) requesting (or ordering) data session control (e.g. creation and modification).

UPF A is configured to perform data session control (e.g. creation and modification) of terminal 1 on the basis of the data session information and the service requirement information in response to the data session-related request received from the SMF.

The SMF is required to allow UPF A to recognize itself as a master UPF, and may employ any methods by which UPF A can recognize itself as a master UPF.

For example, when the SMF transmits a data session-related request requesting (or ordering) data session control (e.g. creation and modification) to UPF A, the SMF may provide data session information, service requirement information, and master and slave interconnection information after inserting, in a pre-defined master field in a message, the pieces of information, whereby the SMF may allow UPF A to recognize itself as a master UPF when UPF A identifies the corresponding pieces of information in the master field.

Alternatively, when the SMF transmits a data session-related request to UPF A, the SMF may insert, in a pre-defined master field in a message, a separate identifier allowing recognition of a master UPF so as to allow UPF A to recognize itself as the master UPF when UPF A identifies the described identifier in the master field.

In the present disclosure, data session information, service requirement information, and master and slave interconnection information identified in a master field, or data session information, service requirement information, and master and slave interconnection information at the time of the identification of an identifier allowing recognition of a master UPF are defined as master operation information described later.

Hereinafter, for convenience of explanation, a data session control situation for creating a data session with terminal 1 will be assumed.

That is, UPF A may perform data session creation for terminal 1 on the basis of the data session information and the service requirement information in response to the data session-related request received from the SMF and may recognize itself as the master UPF on the basis of the master field.

If UPF A having recognized itself as the master UPF receives a data packet through the data session of terminal 1, UPF A performs its own function on the received data packet.

The data packet received through the data session of terminal 1 is generated first in a data service using the data session and may be an uplink packet or a downlink packet.

Hereinafter, for convenience of explanation, the data packet is assumed to be an uplink packet.

That is, if UPF A having recognized itself as the master UPF receives a data packet through the data session of terminal 1 from terminal 1, UPF A performs its own function on the data packet, then converts at least one of data session information, service requirement information, and master and slave interconnection information provided at the time of the reception of the data session-related request from the SMF and inserts the at least one converted information in the data packet, and transfers the data packet to a subsequent slave UPF (UPF B) recognized from the master operation information (master and slave interconnection information).

The transfer of the data packet between UPF A and UPF B is performed through a particular interface, for example, a N9 interface, defined for signaling between the UPFs.

Although UPF B has not received a signal (data session-related request) directly from the SMF, UPF B may obtain information required for controlling (creating) the data session of terminal 1 from the converted information inserted in the data packet received from UPF A, as in the case where UPF B has received the signal from the SMF.

UPF B may also identically perform data session creation for terminal 1 on the basis of data session information and service requirement information which are identical to those of UPF A having received the signal from the SMF, on the basis of the converted information (data session information, service requirement information, and the like) inserted in the data packet.

Further, UPF B performs its own function on the current data packet received through the currently controlled (created) data session of terminal 1, then maintains, without change, the information converted and inserted by UPF A or partially modifies the information, and then transfers the current data packet to a subsequent slave UPF (UPF C) recognized from master and slave interconnection.

The transfer of the data packet between UPF B and UPF C is also performed through a particular interface, for example, a N9 interface, defined for signaling between the UPFs.

Although UPF C has not received a signal (data session-related request) directly from the SMF, UPF C may obtain information required for controlling (creating) the data session of terminal 1 from the converted information inserted in the data packet received through UPF B from UPF A, as in the case where UPF C has received the signal from the SMF.

UPF C may also identically perform data session creation for terminal 1 on the basis of data session information and service requirement information which are identical to those of UPF A having received the signal from the SMF, on the basis of the converted information (data session information, service requirement information, and the like) inserted in the data packet.

UPF C, which does not have a subsequent slave UPF identified in the master and slave interconnection, may perform its own function on the current data packet received through the currently controlled (created) data session of terminal 1 and then transfer the data packet to an external data network (DN) so that the data packet is transmitted to an external Internet server.

Although only UPF A among UPF A, UPF B, and UPF C has received a direct signal from the SMF, all UPF A, UPF B, and UPF C may identically perform data session creation for terminal 1 on the basis of identical data session information and identical service requirement information according to the data session-related request from the SMF.

The data packet between terminal 1 and the server in the data network may be transmitted or received while an identical service requirement (e.g. PDR, FAR, QER, and URR) is applied to the data packet through the data session passing through UPF A, UPF B, and UPF C.

As described above, in the data session control technology on the basis of inter-UPF communications, proposed in the present disclosure, a SMF transmits a signal only to a master UPF among multiple UPFs (e.g. UPFs A, B, and C) and employs a method in which information required for data session control (e.g. creation and modification) is transferred in the sequence of the master UPF, a slave UPF, a slave UPF, . . . through communications (N9 interfaces) transferring a data packet between the UPFs. Therefore, the technology allows the same results as a situation where each of the UPFs (e.g. UPFs A, B, and C) involved in one data session has received an identical signal from the SMF.

Meanwhile, in a data session control technology on the basis of inter-UPF communications, proposed in the present disclosure, a SMF may transmit signals to multiple UPFs (e.g. UPFs A, B, and C), respectively, such that all pieces of information required for data session control (creation) are provided to a master UPF and only a part of the pieces of information required for data session control (creation) is provided to slave UPFs.

In this case, the SMF may employ a method in which the remaining pieces of information required for data session control (e.g. creation and modification) are transferred in the sequence of the master UPF, a slave UPF, a slave UPF, . . . through communications (N9 interfaces) transferring a data packet between the UPFs. Therefore, the SMF may allow the same results as a situation where each of the UPFs (e.g. A, B, and C) involved in one data session has received an identical signal from the SMF.

Hereinafter, referring to FIGS. 3 and 4, a configuration of a data transceiver according to an embodiment of the present disclosure will be described.

The data transceiver of the present disclosure may be one of the UPFs illustrated in FIG. 2.

Hereinafter, for convenience of explanation, a data transceiver 100 operating in view of a master UPF will be described with reference to FIG. 3, and a data transceiver 200 operating in view of a slave UPF will be described with reference to FIG. 4.

With respect to a data transceiver (hereinafter, UPF) of the present disclosure, illustrated in FIG. 3, the UPF 100 includes a session control unit 110, an information generation unit 120, and a packet transfer unit 130.

The session control unit 110 is configured to control a data session of a particular terminal in response to a request relating to the data session, received from a control node.

The information generation unit 120 is configured to, at the time of the reception of the request, generate particular information defined by identified master operation information relating to the control of the data session.

The particular information may be included in a particular header of a data packet.

The packet transfer unit 130 is configured to insert the particular information, i.e. a particular header, in a data packet received through the data session from the particular terminal and transfer the data packet to a particular slave UPF recognized from the master operation information, so as to allow the particular slave UPF to identically perform data session control for the particular terminal in response to the request on the basis of the particular header.

As described above, the UPF 100 illustrated in FIG. 3 operates in view of a master UPF.

Hereinafter, for convenience of explanation, the configuration of the UPF 100 will be explained with reference to the control of a data session for terminal 1 as illustrated in FIG. 2. Therefore, the particular terminal described above corresponds to terminal 1.

The SMF may periodically obtain and identify N/W network information (current N/W topology) from another control node (e.g. NRF) and recognize a list of real-time usable UPFs, the connectivity between UPFs, the location of each UPF, the capability thereof, etc. on the basis of the N/W network information.

When a data session creation event for terminal 1 occurs or a data session modification event for terminal 1 occurs, the SMF may select combinations of UPFs which can be connected with each other and involved in a data session of terminal 1, on the basis of the location of each UPF, the interconnectivity between UPFs, and the capability of each UPF, and select a combination, among the selected combinations, having the most excellent property in terms of expected service delays (latency and throughput).

The capability of a UPF may be, for example, the load state (e.g. CPU, memory, and storage) of the UPF, slice ID information of the UPF, ID of the UPF, the address of the UPF, the type, speed, and load of an interface connected to the UPF.

The type of an interface connected to the UPF may include a physical type (e.g. wired: optical fiber cable and copper cable, and wireless: WiFi), a physical module (e.g. optical transceiver and RJ45 transceiver), a physical port position (e.g. port 1 and port 2), physical combination information or logical combination information (e.g. the combination of four 10 GbE cables, active-standby structure, and active-active redundancy structure), logical identification information (e.g. Eth1, wlan1, and br1), and the like.

The speed of an interface connected to the UPF may be based on all or a part of bandwidth (e.g. bandwidths 1 Gb/s and 10 Gb/s), transfer speed (e.g. throughputs 10 Mb/s and 1 Gb/s), the speed of the entire traffic in progress (e.g. all PDU sessions and all packet flows in sessions), the number of sessions and flows in progress, and speed for each session and flow in progress (e.g. session1=20 Mb/s, session2=40 Mb/s, Flow1=1 Mb/s, and Flow2=5 Mb/s), usage for each session and flow in progress, unidirectional and bidirectional delay values, unidirectional and bidirectional delay values for each session and flow, the size types of unidirectional and bidirectional data for each session and flow (e.g. 64, 512, and 1500 bytes), and the type and number of traffic data errors for each session and flow.

The load of an interface connected to the UPF may be based on all or a part of resource load status information relating to the load of resources in the UPF or SMF, relating to interface processing (e.g. CPU, memory, and storage), interface load status information relating to the load of the interface connected in the UPF, relating to interface processing (e.g. N3, N6, and N9 interfaces), interface load status information relating to the load of the interface connected in the SMF or UPF, relating to interface processing (e.g. Nsmf and Nupf interfaces), and event status information relating to an interface message type (e.g. PDR, QER, FAR, and URR related to the creation, modification, and removal of a session).

If the selection of the combination is illustrated with reference to FIG. 2, the SMF selects the combination of UPFs A, B, and C as a combination, among combinations of UPFs which can be involved in a data session of terminal 1, having the most excellent property in terms of expected service delays (latency and throughput).

Further, the SMF may select, as a master UPF, a UPF which has the most excellent capability or closest to an access end 10 of terminal 1 in the selected combination (UPFs A, B, and C), and may determine interconnection between the master UPF and the remaining slave UPFs (master and slave interconnection information).

The master UPF may operate a PDU session anchor (PSA).

The slave UPFs may be an intermediate-UPF or a branching point-UPF.

If the selection of the master UPF from the combination is illustrated with reference to FIG. 2, the SMF selects, as a master UPF, UPF A among UPFs A, B, and C in the selected combination, and the UPF 100 which has been explained corresponds to UPF A.

The session control unit 110 is configured to control a data session of a particular terminal, i.e. terminal 1, in response to a request relating to the data session, received from a control node, i.e. the SMF.

According to an embodiment, the SMF provides data session information and service requirement information (e.g. PDR, FAR, QER, and URR) for data session control (e.g. creation and modification), and master and slave interconnection information, only to UPF A, which is a master UPF, rather than each of UPFs A, B, and C involved in a data session of terminal 1, thereby transmitting a signal (hereinafter, data session-related request) requesting (or ordering) data session control (e.g. creation and modification).

The session control unit 110 of the UPF 100 (UPF A) selected as the master UPF receives a signal, that is, a data session-related request for terminal 1 from the SMF.

The session control unit 110 performs data session control (e.g. creation and modification) for terminal 1 on the basis of data session information and service requirement information in response to the data session-related request.

Hereinafter, for convenience of explanation, the occurrence of a data session creation event for terminal 1 and a resultant data session control for creating a data session for terminal 1 will be assumed.

That is, the session control unit 110 may perform data session creation for terminal 1 on the basis of data session information and service requirement information in response to the data session-related request, and a created data session of terminal 1 may be updated and managed in a data session table in the UPF 100 (UPF A).

The information generation unit 120 is configured to, at the time of the reception of the request, i.e. a signal (data session-related request) from the SMF, identify master operation information relating to data session control (e.g. creation) and generate a particular header defined by the master operation information.

Specifically, the SMF is required to allow the UPF 100 (UPF A) to recognize itself as a master UPF.

To this end, when the SMF transmits the data session-related request to the UPF 100 (UPF A), the SMF may provide data session information, service requirement information, and master and slave interconnection information after inputting same in a master field pre-defined in a message, thereby allowing the UPF 100 (UPF A) to recognize itself as a master UPF when the UPF identifies the corresponding pieces of information in the master field.

Alternatively, when the SMF transmits the data session-related request to the UPF 100 (UPF A), the SMF may insert, in a master field pre-defined in a message, a separate identifier allowing recognition of a master UPF, so as to allow UPF A to recognize itself as the master UPF when UPF A identifies the described identifier in the master field.

The information generation unit 120 may, at the time of the reception of a data session-related request from the SMF and as master operation information relating to data session control (e.g. creation), identify data session information, service requirement information, and master and slave interconnection information identified in a master field, or data session information, service requirement information, and master and slave interconnection information at the time of the identification of an identifier allowing recognition of a master UPF.

That is, the UPF 100 (UPF A) of the present disclosure may recognize itself as a master UPF when the UPF identifies master operation information at the time of the reception of a data session-related request from the SMF.

Specifically, the master operation information may include data session information of the data session according to the current data session-related request, service requirement information including at least one of end-to-end information, a packet detection rule (PDR), a forwarding action rule (FAR), a QoS enforcement rule (QER), and a usage reporting rule (URR), and master and slave interconnection information.

When the information generation unit 120 identifies master operation information at the time of the reception of a data session-related request from the SMF, the information generation unit 120 may generate a particular header defined by the master operation information, i.e. data session information, service requirement information, and master and slave interconnection information.

The particular header may correspond to a header (e.g. N9 header or 5G UP header) defined in a particular interface defined for signaling between the UPFs, that is, a N9 interface.

A 5G UP header may correspond to various protocol headers such as a VXLAN, a GTPU, and a GRE.

The information included in the particular header may include at least one of data session information, service requirement information, master and slave interconnection information, and address information (next-hop address information) relating to a slave UPF recognized to be directly connected to the particular slave UPF described above from the master and slave interconnection information.

The particular slave UPF means a slave UPF, that is, UPF B, recognized to be directly connected to the UPF 100 (UPF A) from the master and slave interconnection information.

Therefore, next-hop address information included in a particular header generated by the information generation unit 120 of the UPF 100 (UPF A) means the address information of a slave UPF, that is, UPF C, recognized to be directly connected to UPF B from the master and slave interconnection information.

The packet transfer unit 130 is configured to insert the previously generated particular header (hereinafter, 5G UP header) in a data packet received through a data session created for terminal 1 and then transfer the data packet to the particular slave UPF, that is, UPF B.

Under the assumption of a control situation relating to data session creation for terminal 1, the data packet received through the data session of terminal 1 is generated first in a data service using the data session and may be an uplink packet or a downlink packet.

Hereinafter, for convenience of explanation, the data packet is assumed to be an uplink packet.

That is, the packet transfer unit 130 of the UPF 100 (UPF A) having recognized itself as the master UPF allows a function of the UPF 100 (UPF A) to be performed on the data packet received from terminal 1 through the data session of terminal 1, inserts the previously generated 5G UP header in the data packet, and transfers the data packet to UPF B, which is a subsequent slave UPF recognized from the master and slave interconnection information in the master operation information.

The packet transfer unit 130 may be configured to modify an encapsulation header of the data packet, that is, at least one of an IP header, a UDP header, a GTP header, and a VxLAN header, into a particular header described above, that is, a 5G UP header, thereby inserting the 5G UP header in the data packet.

Alternatively, the packet transfer unit 130 may be configured to additionally insert a particular header described above, that is, a 5G UP header in a header of the data packet, thereby inserting the 5G UP header in the data packet.

Further, the packet transfer unit 130 is configured to transfer the data packet of terminal 1 to UPF B through a particular interface, that is, a N9 interface, defined for signaling between the UPFs.

Although UPF B, which is a slave UPF, has not received a signal (data session-related request) directly from the SMF, UPF B may obtain information required for controlling (creating) the data session of terminal 1 from the information in the 5G UP header inserted in the data packet received from UPF A, as in the case where UPF B has received the signal from the SMF.

Hereinafter, a data transceiver (hereinafter, UPF) of the present disclosure, operating in view of a slave UPF, will be described with reference to FIG. 4.

Figure 4:
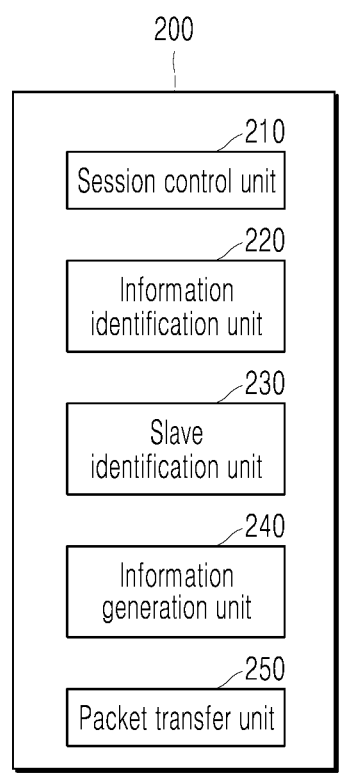

As illustrated in FIG. 4, a UPF 200 of the present disclosure includes a session control unit 210 and an information identification unit 220.

The information identification unit 220 is configured to, at the time of the reception of a data packet from another data transceiver, identify particular information of the data packet.

The particular information may be included in a particular header of the data packet.

That is, when the information identification unit receives a data packet from another data transceiver, the information identification unit may identify a particular header of the data packet.

The session control unit 210 is configured to, when there is no data session identical to that indicated by the information in the particular header identified by the information identification unit 220, control a data session of a particular terminal on the basis of the information in the particular header.

As described above, the UPF 200 illustrated in FIG. 4 means a UPF operating in view of a slave UPF.

Hereinafter, for convenience of explanation, the configuration of the UPF 200 will be explained with reference to the control of a data session for terminal 1 as illustrated in FIG. 2. Therefore, the particular terminal described above corresponds to terminal 1.

The information identification unit 220 is configured to, at the time of the reception of a data packet from another data transceiver, for example, a master UPF or another slave UPF, identify a particular header of the data packet.

That is, when the information identification unit 220 receives a data packet from a master UPF or another slave UPF through a N9 interface, the information identification unit 220 identifies a 5G UP header of the received data packet.

If the 5G UP header of the data packet is identified, the corresponding 5G UP header may include at least one of data session information, service requirement information including at least one of end-to-end information, a packet detection rule (PDR), a forwarding action rule (FAR), a QoS enforcement rule (QER), and a usage reporting rule (URR), master and slave interconnection information, and next-hop address information.

Hereinafter, for convenience of explanation, it will be assumed that a signal (data session-related request) for creating a data session of terminal 1 is transmitted from the SMF to the master UPF A and a 5G UP header described above is defined and created by UPF A while UPF A performs data session creation for terminal 1 according to the described data session-related request.

The session control unit 210 functions to perform data session control in the UPF 200, and thus may control a data session of a particular terminal in response to a request relating to the data session, received from a control node, that is, the SMF.

Further, when there is no data session which is identical to that indicated by information in a particular header, that is, a 5G UP header, the session control unit 210 of the present disclosure is configured to control (e.g. data session creation for terminal 1) the data session of the particular terminal on the basis of the information in the current 5G UP header.

Specifically, the session control unit 210 identifies whether a data session identical to that indicated by information in a 5G UP header identified in a current data packet exists in a data session table managed by the UPF 200.

If the data session identical to that indicated by the information in the 5G UP header does not exist in the data session table, the session control unit 210 controls (e.g. data session creation for terminal 1) the data session of the particular terminal on the basis of the information in the current 5G UP header.

For example, if the current 5G UP header is defined and created by UPF A on the basis of a signal (data session-related request) of the SMF while UPF A performs data session creation for terminal 1, the session control unit 210 may perform data session creation for terminal 1 on the basis of data session information and service requirement information in the 5G UP header, and a resultant data session of terminal 1 may be updated and managed in the data session table in the UPF 200.

As described above, although the UPF 200 of the present disclosure has not received a signal (data session-related request) directly from the SMF, the UPF 200 may: obtain information required for controlling (creating) a data session of terminal 1 from information in a 5G UP header inserted into a data packet received from a master UPF or another slave UPF, as in the case where the UPF 200 has received the signal from the SMF; and perform data session control (data session creation for terminal 1), which is identical to that of the master UPF.

According to another embodiment, a SMF may transmit signals to multiple UPFs (e.g. UPFs A, B, and C), respectively, such that all pieces of information required for data session control (creation) are provided to a master UPF and only a part (e.g. data session information) of the pieces of information required for data session control (creation) is provided to slave UPFs.

In this case, the UPF 200 of the present disclosure may receive a signal (data session-related request) from the SMF, but only receives a part (or minimum information) of pieces of information for data session control through the signal, and may obtain the remaining pieces of information for data session control from information in a 5G UP header inserted into a data packet received from a master UPF or another slave UPF, so that the UPF 200 may perform data session control (data session creation for terminal 1) identical to that of the master UPF.

According to the embodiment, when a data session identical to that indicated by information in a 5G UP header identified in a current data packet does not exist in a data session table managed by the UPF 200, the session control unit 210 may identify whether a data session related to the information in the 5G UP header exists.

Specifically, the session control unit 210 may identify whether a data session having identical data session information and different service requirement information, compared to the information in the 5G UP header identified in the data packet, exists in the data session table managed by the UPF 200.

For example, the session control unit 210 may create a data session of terminal 1 on the basis of data session information according to a signal (data session-related request) received from the SMF and may update the data session of terminal 1 in a data session table managed by the UPF 200.

In this case, a data session of terminal 1, having identical data session information and different service requirement information, compared to information in a 5G UP header identified in a data packet of terminal 1, may exist in the data session table managed by the UPF 200, and the session control unit 210 may identify the existence of the data session as a data session related to the information in the 5G UP header.

If the current 5G UP header is defined and created by UPF A on the basis of a signal (data session-related request) of the SMF while UPF A performs data session creation for terminal 1, the 5G UP header may include information, among data session information, service requirement information, master and slave interconnection information, and address information (next-hop address information), which is not included in a data session-related request (signal) received by the UPF 200 from the SMF.

As described above, if the SMF provides a part of pieces of information among information required for data session control (creation), for example, only data session information, to a slave UPF, a 5G UP header may include service requirement information, master and slave interconnection information, and address information (next-hop address information).

When a data session related to the information in the 5G UP header identified in the data packet of terminal 1 exists, the session control unit 210 may perform data session creation for terminal 1 on the basis of the service requirement information in the 5G UP header and a resultant data session of terminal 1 may be updated and managed in the data session table of the UPF 200.

Further, the UPF 200 of the present disclosure may further include a slave identification unit 230, an information generation unit 240, and a packet transfer unit 250.

The slave identification unit 230 is configured to identify whether there is a slave UPF recognized to be directly connected to the UPF 200, on the basis of information in a current particular header, that is, a 5G UP header.

For example, when next-hop address information is included in the 5G UP header, the slave identification unit 230 may identify a UPF according to the next-hop address information, as a slave UPF recognized to be directly connected to the UPF 200.

Alternatively, when the 5G UP header does not include next-hop address information and includes master and slave interconnection information, the slave identification unit 230 may identify a subsequent slave UPF recognized to be directly connected to the UPF 200, from the master and slave interconnection information.

If the UPF 200 corresponds to the last slave UPF among the UPFs involved in the data session of terminal 1, the slave identification unit 230 may identify that there is no subsequent slave UPF recognized to be directly connected to the UPF 200, from the master and slave interconnection information.

Hereinafter, for convenience of explanation, it will be assumed that if a subsequent slave UPF exists or is identified, the UPF 200 corresponds to UPF B illustrated in FIG. 2 and the subsequent slave UPF corresponds to UPF C, and if a subsequent slave UPF does not exist, the UPF 200 corresponds to UPF C illustrated in FIG. 2.

The information generation unit 240 is configured to, if the slave identification unit 230 identifies a slave UPF, modify a 5G UP header of a currently received data packet to transmit same to the slave UPF.

For example, when the 5G UP header includes next-hop address information, the information generation unit 240 of the UPF 200 (UPF B) modifies the next-hop address information in the 5G UP header into the address information of a slave UPF (UPF C), which is a subsequent slave, recognized to be directly connected to UPF 200 from the master and slave interconnection information.

When the 5G UP header does not include next-hop address information and only includes master and slave interconnection information, the information generation unit 240 of the UPF 200 (UPF B) may not modify the 5G UP header.

The packet transfer unit 250 is configured to transfer the data packet having the 5G UP header having been modified by the information generation unit 240 or the data packet having the 5G UP header having not been modified by the information generation unit 240, to a subsequent slave UPF identified by the slave identification unit 230, that is, UPF C.

That is, if a function of the UPF 200 (UPF B) is performed on the data packet received through the data session (terminal→UPF A) of terminal 1, and then the 5G UP header in the data packet is modified as needed, the packet transfer unit 250 of the UPF 200 (UPF B) transfers the data packet to a subsequent slave UPF (UPF C) recognized from the master and slave interconnection information in the master operation information.

The packet transfer unit 250 is configured to, when a subsequent slave UPF is not identified by the slave identification unit 230, that is, the UPF 200 (UPF C) is the last slave UPF involved in the data session of terminal 1, transfer the data packet to the data network.

That is, the packet transfer unit 250 of the UPF 200 (UPF C) having identified itself as the last slave UPF transfers the data packet, which is received through the data session (terminal→UPF A→UPF B) of terminal 1, to the data network if a function of the UPF 200 (UPF C) is performed on the data packet.

As described above, according to an embodiment of the present disclosure, the SMF transmits a signal only to a master UPF among multiple UPFs (e.g. UPFs A, B, and C) and employs a method in which information required for data session control (e.g. creation and modification) is transferred in the sequence of the master UPF, a slave UPF, a slave UPF, . . . through communications (N9 interfaces) transferring a data packet between the UPFs. Therefore, the SMF allows the same results as a situation where each of the UPFs (e.g. UPFs A, B, and C) involved in one data session has received an identical signal from the SMF.

According to another embodiment, the SMF may transmit signals to multiple UPFs (e.g. A, B, and C), respectively, such that all pieces of information required for data session control (creation) are provided to a master UPF and only a part of the pieces of information required for data session control (creation) is provided to slave UPFs.

In this case, in the present disclosure, the SMF employs a method in which the remaining pieces of information required for data session control (e.g. creation and modification) are transferred in the sequence of the master UPF, a slave UPF, a slave UPF, . . . through communications (N9 interfaces) transferring a data packet between the UPFs. Therefore, the SMF may allow the same results as a situation where each of the UPFs (e.g. UPFs A, B, and C) involved in one data session has received an identical signal from the SMF.

According to the present disclosure, when a data session based on communications between UPFs is controlled, the number of signalings for data session control can be reduced significantly, and a time delay until all UPFs involved in one data session identically perform data session control (e.g. creation and modification) can be reduced remarkably.

Therefore, according to the present disclosure, the requirements and performances of a service type supported in the 5G technology can be efficiently supported.

Hereinafter, referring to FIG. 5, an embodiment of a data session control procedure according to a data session control technology on the basis of inter-UPF communications according to the present disclosure will be explained.

A SMF may periodically obtain and identify N/W network information (current N/W topology) from another control node (e.g. NRF) and recognize a list of real-time usable UPFs, the connectivity between UPFs, the location of each UPF, the capability thereof, etc. on the basis of the N/W network information (S10).

When a data session creation event for terminal 1 occurs or a data session modification event for terminal 1 occurs (S20), the SMF determines a mater slave UPF and a slave UPF involved in a data session of terminal 1 (S30).

For example, the SMF may select combinations of UPFs which can be connected with each other and involved in a data session of terminal 1, on the basis of the location of each UPF, the interconnectivity between UPFs, and the capability thereof, and may select a combination, among the selected combinations, having the most excellent property in terms of expected service delays (latency and throughput).

Figure 5:
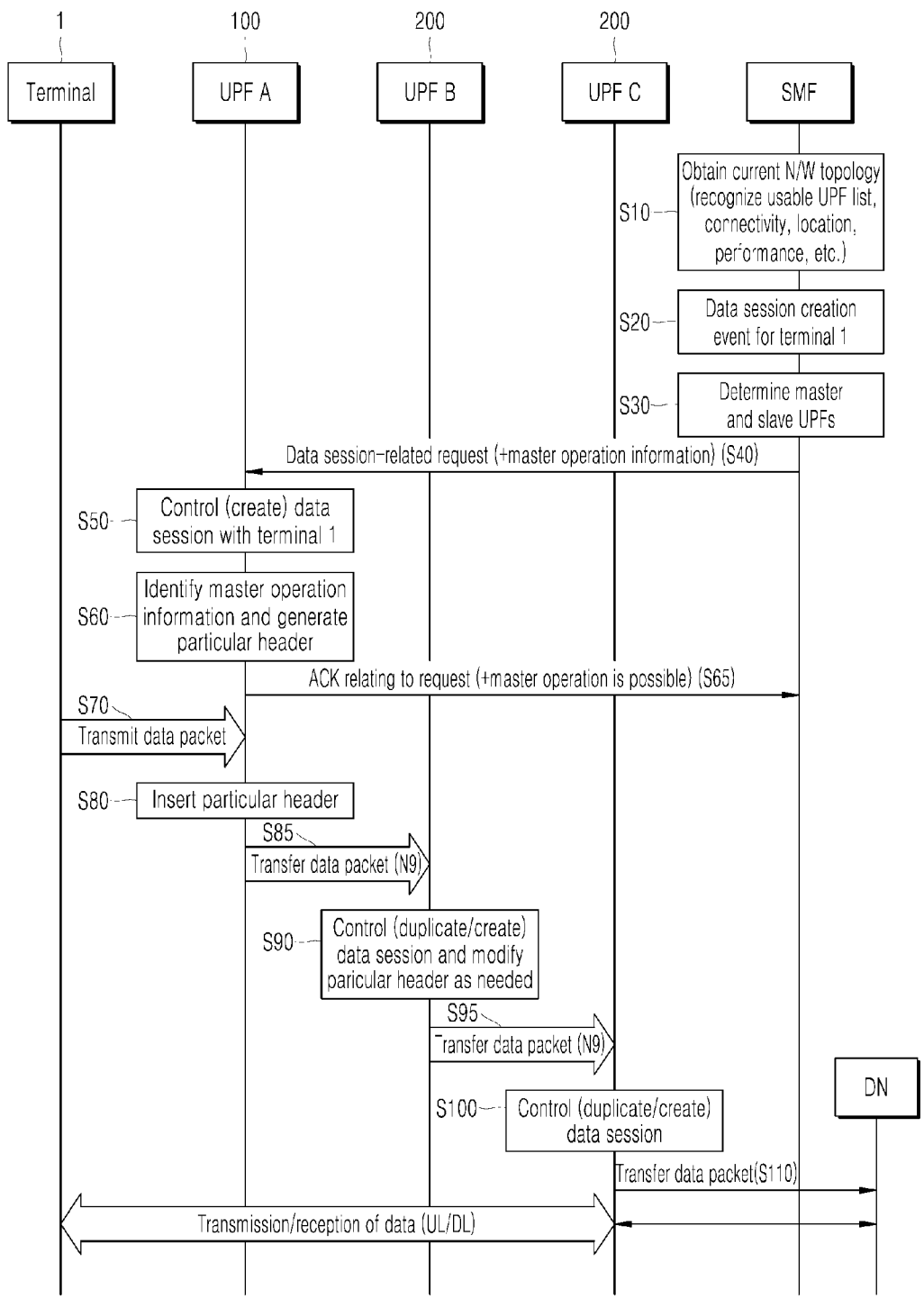
FIGS. 5 and 6 are signal flowcharts illustrating a data session control procedure according to an embodiment of the present disclosure.

FIG. 5 illustrates that the SMF selects the combination of UPFs A, B, and C as a combination, among combinations of UPFs which can be involved in a data session of terminal 1, having the most excellent property in terms of expected service delays (latency and throughput).

Further, the SMF may select, as a master UPF, a UPF which has the most excellent capability or closest to an access end 10 of terminal 1 in the selected combination (UPFs A, B, and C), and may determine interconnection between the master UPF and the remaining slave UPFs (master and slave interconnection information) and interconnection between the remaining slave UPFs (master and slave interconnection information) (S30).

If the selection of the combination is illustrated with reference to FIG. 5, the SMF selects, as a master UPF, UPF A among UPFs A, B, and C in the selected combination, and determines interconnection (master and slave interconnection information) representing UPF A-→UPF B-→UPF C.

The SMF may provide UPF A, which is a master UPF, with data session information and service requirement information for data session control (e.g. creation and modification), and master and slave interconnection information, thereby transmitting a signal (hereinafter, data session-related request) requesting (or ordering) data session control (e.g. creation and modification) (S40).

When the SMF transmits the data session-related request, the SMF may provide data session information, service requirement information, and master and slave interconnection information after inserting, in a pre-defined master field in a message, the pieces of information, or may insert a separate identifier in the master field, thereby allowing the UPF A to recognize the data session information, service requirement information, and master and slave interconnection information, as master operation information, and recognize itself as a master UPF (S40).

Hereinafter, for convenience of explanation, a data session control situation for creating a data session with terminal 1 will be assumed.

UPF A may perform a control of creating a data session of terminal 1 on the basis of the data session information and the service requirement information in response to the data session-related request received from the SMF (S50).

UPF A recognizes itself as a master UPF on the basis of the master field and identifies the reception of the master operation information, and generates a particular header, that is, a 5G UP header, defined by the master operation information (S60).

UPF A may send, to the SMF, an ACK relating to the data session-related request and the fact that UPF A can operate as a master (S65).

If UPF A receives a data packet through the data session of terminal 1 (S70), UPF A performs its own function and then insert, in the data packet, a particular header, that is, a 5G UP header, pre-generated with respect to the current data session (S80), and transfers the data packet to UPF B, which is a subsequent slave UPF recognized from the master operation information (master and slave interconnection information) (S85).

The transfer of the data packet between UPF A and UPF B is performed through a N9 interface defined for signaling between the UPFs.

Although UPF B has not received a signal (data session-related request) directly from the SMF, UPF B may identically obtain information required for controlling (creating) a data session of terminal 1 from information in a 5G UP header inserted in the data packet received from UPF A, as in the case where UPF B has received the signal from the SMF (duplication).

UPF B may also identically perform a control of creating a data session of terminal 1 on the basis of data session information and service requirement information which are identical to those of UPF A having received the signal from the SMF, on the basis of the information (data session information and service requirement information) in the 5G UP header in the data packet (S90).

UPF B performs its own function on the current data packet received through the currently controlled (created) data session of terminal 1, then maintains, without change, the 5G UP header inserted by UPF A or partially modifies the 5G UP header (S90), and then transfers the current data packet to UPF C, which is a subsequent slave UPF recognized from master and slave interconnection (S95).

The transfer of the data packet between UPF B and UPF C is also performed through a N9 interface.

Although UPF C has not received a signal (data session-related request) directly from the SMF, UPF C may identically obtain information required for controlling (creating) a data session of terminal 1 from the information in the 5G UP header inserted in the data packet received through UPF B from UPF A, as in the case where UPF C has received the signal from the SMF (duplication).

UPF C may also identically perform a control of creating a data session of terminal 1 on the basis of data session information and service requirement information which are identical to those of UPF A having received the signal from the SMF, on the basis of the information (data session information and service requirement information) in the 5G UP header of the data packet (S100).

UPF C, which does not have a subsequent slave UPF identified in the master and slave interconnection, may process its own function on the current data packet received through the currently controlled (created) data session of terminal 1 and then transfer the data packet to an external data network (DN) so that the data packet is transmitted to an external Internet server (S110).

Although only UPF A among UPF A, UPF B, and UPF C has received a direct signal from the SMF, all UPF A, UPF B, and UPF C may identically perform data session creation for terminal 1 on the basis of identical data session information and identical service requirement information according to the data session-related request from the SMF.

A data packet between terminal 1 and the server in the data network may be transmitted or received while an identical service requirement (e.g. PDR, FAR, QER, and URR) is applied to the data packet through a data session passing through UPF A, UPF B, and UPF C.

Figure 6:
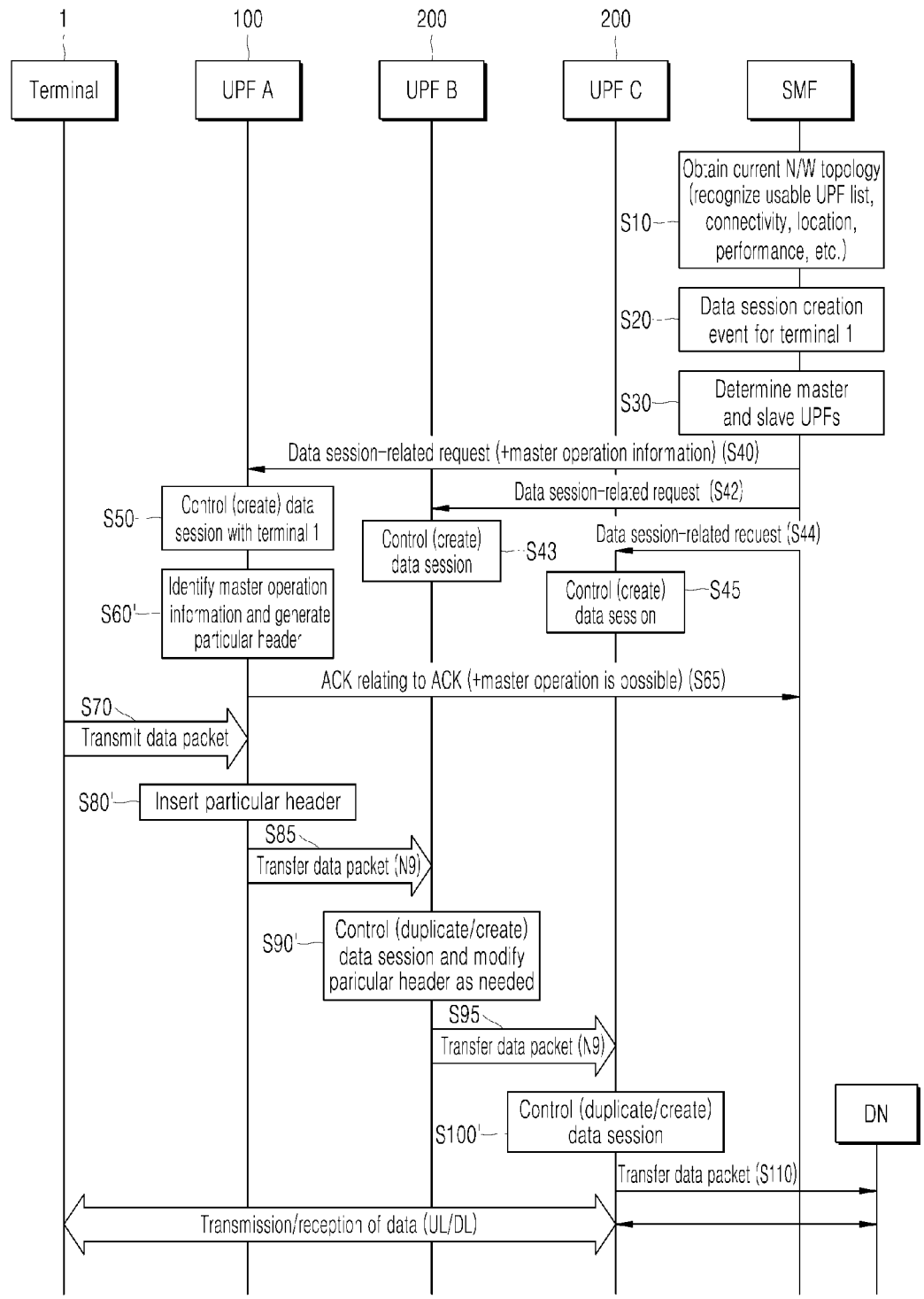

Hereinafter, referring to FIG. 6, another embodiment of a data session control procedure according to a data session control technology on the basis of inter-UPF communications according to the present disclosure will be explained.

For convenience of explanation, as illustrated in FIG. 5, a data session control for creating a data session with terminal 1 will be assumed.

The procedures illustrated in FIG. 5 are identical to the procedures S10, S20, and S40, performed by a SMF, of recognizing a list of real-time usable UPFs, the connectivity between UPFs, the location of each UPF, the capability thereof, etc., determining a master UPF and slave UPFs involved in a data session of terminal 1, and providing data session information and service requirement information for data session control (e.g. creation) and master and slave interconnection information to UPF A, which is the master UPF, thereby transmitting a signal (hereinafter, data session-related request) requesting (ordering) data session control (e.g. creation). Therefore, specific descriptions of the procedures will be omitted.

The SMF provides a part (e.g. data session information) of the pieces of information provided to the master UPF to control (e.g. create) the data session, to UPFs B and C, which are slave UPFs, thereby transmitting a signal (hereinafter, data session-related request) requesting (or ordering) data session control (e.g. creation) (S42 and S44).

UPF B performs a control of creating a data session of terminal 1 on the basis of the data session information in response to the data session-related request received from the SMF (S43).

UPF C performs a control of creating a data session of terminal 1 on the basis of the data session information in response to the data session-related request received from the SMF (S45).

UPF A performs a control of creating a data session of terminal 1 on the basis of the data session information and service requirement information in response to the data session-related request received from the SMF (S50).

UPF A recognizes itself as a master UPF on the basis of a master field and identifies the reception of master operation information, and generates a particular header, that is, a 5G UP header, defined by the master operation information (S60').

The generated 5G UP header may include information, among data session information, service requirement information, master and slave interconnection information, and address information (next-hop address information), which is not included in the data session-related request (signal) received by the slave UPFs from the SMF.

As described above, if the SMF provides, to the slave UPFs, only a part of the pieces of information required for data session control (creation), for example, data session information, the 5G UP header may include service requirement information, master and slave interconnection information, and address information (next-hop address information).

If a data packet is received through the data session of terminal 1 (S70), UPF A performs its own function on the data packet and then inserts, in the data packet, a particular header, that is, 5G UP header, pre-generated with respect to the current data session (S80'), and then transfers the data packet to UPF B, which is a subsequent slave UPF recognized from the master operation information (master and slave interconnection information) (S85).

UPF B may receive a signal (data session-related request) from the SMF, but only receive a part (or minimum information) of pieces of information for data session control through the signal, and may obtain the remaining pieces of information for data session control from information in the 5G UP header inserted into the data packet received from UPF A, whereby the UPF 200 may identically obtain the pieces of information required for controlling (creating) a data session for terminal 1 (duplicate).

UPF B may also perform data session control (data session creation for terminal 1) identical to that of UPF A (S90').

UPF B performs its own function on the current data packet received through the currently controlled (created) data session of terminal 1, then maintains, without change, the 5G UP header inserted by UPF A or partially modifies the 5G UP header (S90'), and then transfers the current data packet to UPF C, which is a subsequent slave UPF recognized from master and slave interconnection (S95).

UPF C may receive a signal (data session-related request) from the SMF, but only receive a part (or minimum information) of pieces of information for data session control through the signal, and may obtain the remaining pieces of information for data session control from the information in the 5G UP header inserted into the data packet received through UPF B from UPF A, whereby UPF C may identically obtain the pieces of information required for controlling (creating) a data session for terminal 1 (duplication).

UPF C may also perform data session control (data session creation for terminal 1) identical to that of UPF A (S100').

UPF C, which does not have a subsequent slave UPF identified in the master and slave interconnection, may perform its own function on the current data packet received through the currently controlled (created) data session of terminal 1 and then transfer the data packet to an external data network (DN) so that the data packet is transmitted to an external Internet server (S110).

Hereinafter, referring to FIGS. 7 and 8, an operation method of a data transceiver (UPF) according to an embodiment of the present disclosure will be described.

Figure 3:
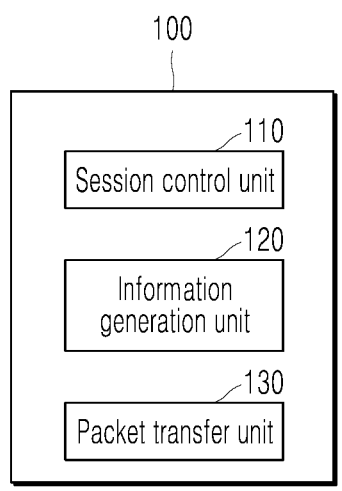
FIGS. 3 and 4 are block diagrams illustrating a configuration of a data transceiver according to an embodiment of the present disclosure.

A UPF according to the present disclosure may be one of the UPFs illustrated in FIG. 2, and hereinafter, for convenience of explanation, FIG. 2 illustrates a UPF 100 operating in view of a master UPF and FIG. 3 illustrates a UPF 200 operating in view of a slave UPF.

Figure 7:
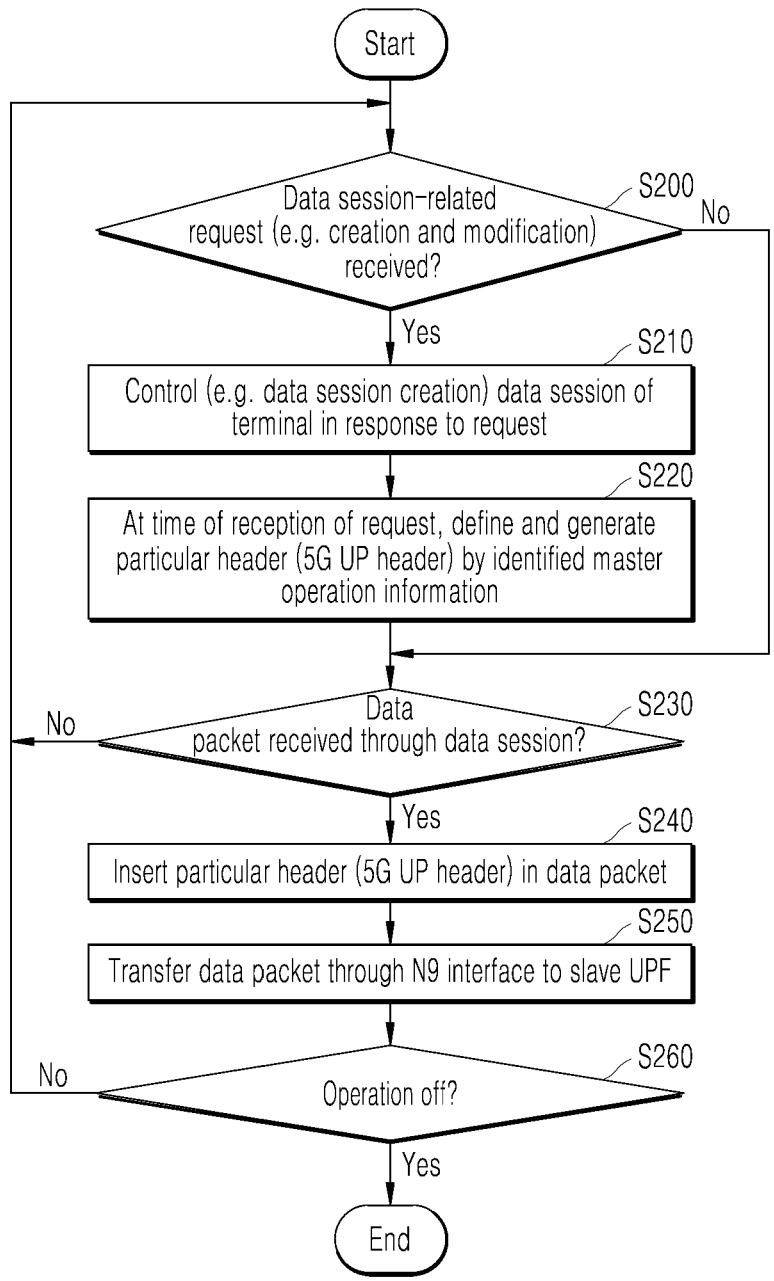
FIGS. 7 and 8 are signal flowcharts illustrating an operation method of a data transceiver according to an embodiment of the present disclosure.
Figure 8:
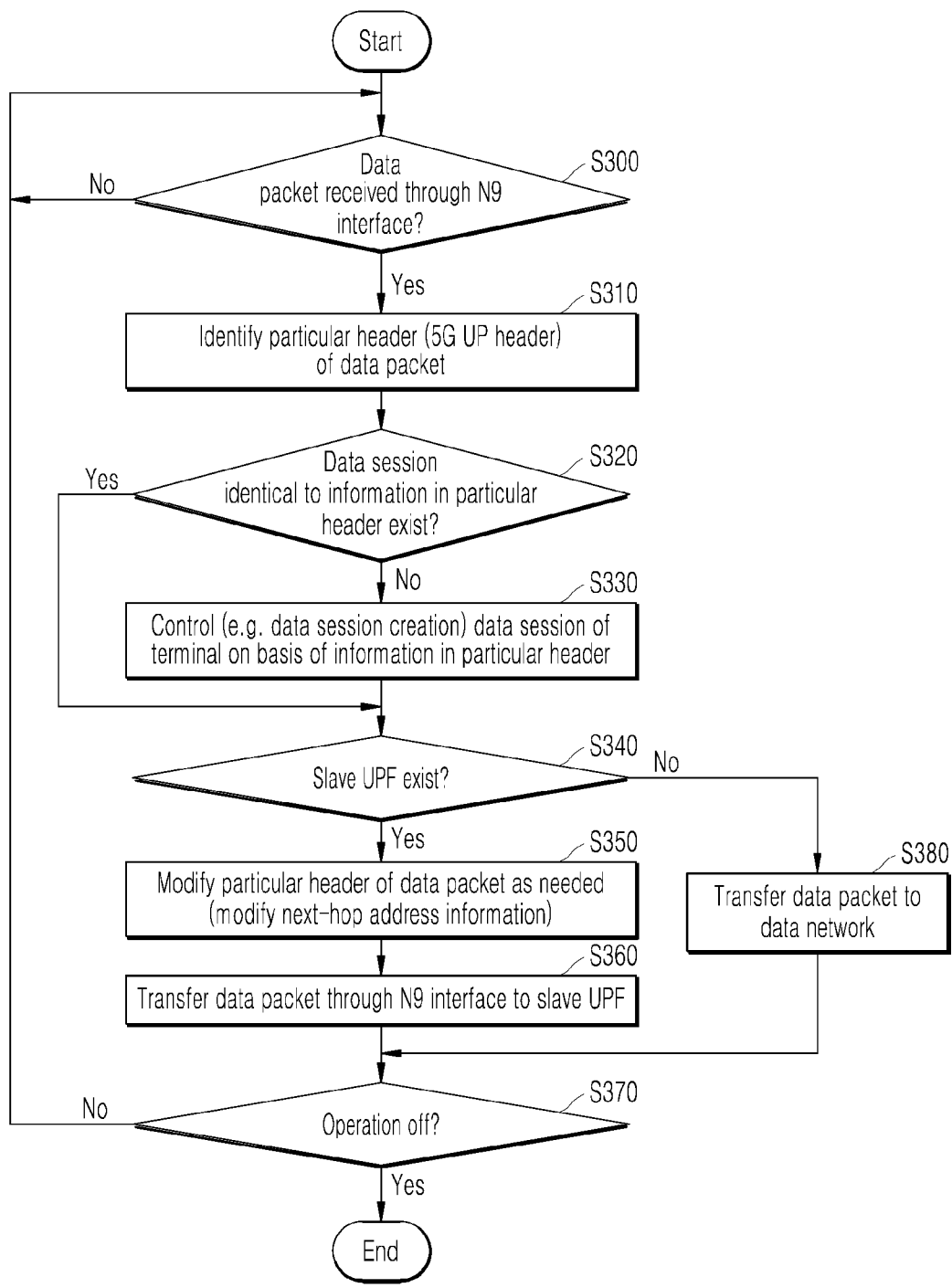

Referring to FIG. 7, the UPF 100 of the present disclosure identifies whether a data session-related request (e.g. creation and modification) is received (S200).

Hereinafter, for convenience of explanation, the UPF 100 will be assumed to receive a signal requesting data session creation for terminal 1, that is, a data session-related request (creation) from the SMF.

The UPF 100 of the present disclosure performs data session creation for terminal 1 on the basis of data session information and service requirement information in response to the data session-related request, and a resultant data session of terminal 1 may be updated and managed in a data session table in the UPF 100 (S210).

When the UPF 100 of the present disclosure receives the data session-related request from the SMF, the UPF 100 of the present disclosure identifies master operation information related to data session control (e.g. creation) and generates a particular header, that is, a 5G UP header, defined by the master operation information (S220).

Specifically, when the UPF 100 of the present disclosure receives the data session-related request from the SMF and then identifies corresponding pieces of information or an identifier as described above in a master field, the UPF 100 of the present disclosure may identify, as the master operation information, data session information, service requirement information, and master and slave interconnection information identified in the master field, or data session information, service requirement information, and master and slave interconnection information at the time of the identification of the identifier.

Specifically, the master operation information may include data session information of the data session according to the current data session-related request, service requirement information including at least one of end-to-end information, a packet detection rule (PDR), a forwarding action rule (FAR), a QoS enforcement rule (QER), and a usage reporting rule (URR), and master and slave interconnection information.

When the UPF 100 identifies the master operation information at the time of the reception of the data session-related request from the SMF, the UPF 100 may generate a 5G UP header defined by the master operation information, that is, data session information, service requirement information, and master and slave interconnection information.

Information included in a particular header, that is, the 5G UP header may include at least one of data session information, service requirement information, master and slave interconnection information, and next-hop address information.

When the UPF 100 of the present disclosure receives a data packet through the data session created with respect to terminal 1 (S230 Yes), the UPF 100 inserts the previously generated 5G UP header in the data packet received from terminal 1 (S240) and then transfers the data packet through a N9 interface to a subsequent slave UPF, that is, UPF B (S250).

That is, the UPF 100 of the present disclosure performs a function of the UPF 100 (UPF A) on the data packet received through the data session of terminal 1, then inserts the previously generated 5G UP header in the data packet, and transfers the data packet to UPF B, which is a subsequent slave UPF recognized from the master and slave interconnection information in the master operation information The UPF 100 of the present disclosure may insert the 5G UP header in the data packet by modifying an encapsulation header of the data packet, that is, at least one of an IP header, a UDP header, a GTP header, and a VxLAN header, into the particular header described above, that is, the 5G UP header.

Also, the UPF 100 of the present disclosure may insert the 5G UP header in the data packet by additionally inserting the particular header described above, that is, the 5G UP header in a header of the data packet.

Although UPF B, which is a slave UPF, has not received a signal (data session-related request) directly from the SMF, UPF B may obtain information required for controlling (creating) a data session of terminal 1 from information in the 5G UP header inserted in the data packet received from UPF A, as in the case where UPF B has received the signal from the SMF.

The UPF 100 of the present disclosure may repeatedly perform operation S200 and the operations after operation S200 unless the operation is turned off (S260 No).

Hereinafter, referring to FIG. 8, the UPF 200 of the present disclosure identifies whether the UPF 200 receives a data packet from a master UPF or another slave UPF through a N9 interface (S300).

When the UPF 200 of the present disclosure receives the data packet, the UPF 200 identifies a particular header of the received data packet, that is, a 5G UP header (S310).

If the 5G UP header of the data packet is identified, the corresponding 5G UP header may include at least one of data session information, service requirement information, master and slave interconnection information, and next-hop address information.

Hereinafter, for convenience of explanation, it will be assumed that a signal (data session-related request) for creating a data session of terminal 1 is transmitted from the SMF to the master UPF A and a 5G UP header described above is defined and created by UPF A while UPF A performs data session creation for terminal 1 according to the described data session-related request.

The UPF 200 of the present disclosure identifies whether a data session identical to that indicated by information in the 5G UP header exists (S320), and when the data session does not exist (S320 No), the UPF 200 controls (e.g. data session creation for terminal 1) a data session of terminal 1 on the basis of the information in the current 5G UP header.

Specifically, the UPF 200 of the present disclosure identifies whether a data session identical to that indicated by the information in the 5G UP header of the current data packet identified in operation S310 exists in a data session table managed by the UPF 200 (S320).

When the data session identical to that indicated by the information in the 5G UP header does not exist in the data session table (S320 No), the UPF 200 of the present disclosure controls (e.g. data session creation for terminal 1) a data session of the particular terminal on the basis of the information in the current 5G UP header (S330).

For example, if the current 5G UP header is defined and created by UPF A on the basis of the data session-related request from the SMF while UPF A performs data session creation for terminal 1, the UPF 200 of the present disclosure may perform data session creation for terminal 1 on the basis of data session information and service requirement information in the 5G UP header, and a resultant data session of terminal 1 may be updated and managed in the data session table in the UPF 200.

After the updating and managing of the data session, with respect to information in a 5G UP header identified in a data packet through the identical data session (based on N9 interface), received from terminal 1, the UPF 200 of the present disclosure may identify that a data session identical to that indicated by the information exists in the data session table.

As described above, although the UPF 200 of the present disclosure has not received a signal (data session-related request) directly from the SMF, the UPF 200 may obtain information required for controlling (creating) a data session of terminal 1 from the information in the 5G UP header inserted into the data packet received from the master UPF or another slave UPF, as in the case where the UPF 200 has received the signal from the SMF, and may perform identical data session control (data session creation for terminal 1).

The UPF 200 of the present disclosure identifies whether there is a subsequent slave UPF, on the basis of the information in the current 5G UP header (S340).

For example, when next-hop address information is included in the 5G UP header, the UPF 200 of the present disclosure may identify a UPF according to the next-hop address information, as a slave UPF recognized to be directly connected to the UPF 200.

Also, when the 5G UP header does not include next-hop address information and includes master and slave interconnection information, the UPF 200 of the present disclosure may identify a subsequent slave UPF recognized to be directly connected to the UPF 200, from the master and slave interconnection information.

If the UPF 200 corresponds to the last slave UPF among the UPFs involved in a data session of terminal 1, the UPF 200 may identify that there is no subsequent slave UPF recognized to be directly connected to the UPF 200, from the master and slave interconnection information.

Hereinafter, for convenience of explanation, it will be assumed that if a subsequent slave UPF exists or is identified, the UPF 200 corresponds to UPF B and the subsequent slave UPF corresponds to UPF C, and if a subsequent slave UPF does not exist, the UPF 200 corresponds to UPF C.

If the UPF 200 of the present disclosure identifies a subsequent slave UPF (S340 Yes), the UPF 200 modifies a 5G UP header of a currently received data packet to transmit same to the slave UPF (S350).

For example, when the 5G UP header includes next-hop address information, the UPF 200 (UPF B) of the present disclosure modifies the next-hop address information in the 5G UP header into the address information of a slave UPF (UPF C), which is a subsequent slave, recognized to be directly connected to the UPF 200 from the master and slave interconnection information.

When the 5G UP header does not include next-hop address information and only includes master and slave interconnection information, the UPF 200 (UPF B) of the present disclosure may not modify the 5G UP header.

The UPF 200 of the present disclosure transfers the data packet having the 5G UP header having been modified in operation 350 or the data packet having the 5G UP header having not been modified in operation S350, to the subsequent slave UPF, that is, UPF C, identified in operation S340 (S360).

That is, the UPF 200 (UPF B) having identified the existence of a slave UPF subsequent to the UPF 200 itself transfers a data packet, which is received through the data session (terminal→UPF A) of terminal 1, to UPF C if a 5G UP header in the data packet is modified as needed after a function of the UPF 200 (UPF B) is performed on the data packet, wherein UPF C is the subsequent slave UPF recognized from the master and slave interconnection information in the master operation information.

When a subsequent slave UPF is not identified, that is, the UPF 200 (UPF C) of the present disclosure is the last slave UPF involved in a data session of terminal 1 (S340 No), the UPF 200 transfers the data packet to the data network (S380).

That is, the UPF 200 (UPF C) having identified itself as the last slave UPF transfers the data packet, which is received through the data session (terminal→UPF A→UPF B) of terminal 1, to the data network if a function of the UPF 200 (UPF C) is performed on the data packet.

The UPF 200 of the present disclosure may repeatedly perform operation 300 and the operations after operation 300 unless the operation is turned off (S370 No).

According to the present disclosure, when a data session based on communications between UPFs is controlled, the number of signalings for data session control is reduced and thus delays on data session control are reduced, so that the requirements and performances of a service type supported in the 5G technology can be efficiently supported.

An operation method of a data transceiver according to an embodiment of the present disclosure may be implemented as a program command type which can be performed by various computer means, and thus may be recorded in a computer readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer readable recording medium include magnetic media such as hard disks, floppy disks and magnetic tapes, optical media such as a compact disc read-only memory (CD-ROM) and a digital versatile disc (DVD), magneto-optical media such as floppy disks, and hardware devices such as a read-only memory (ROM), a random access memory (RAM) and a flash memory, which are specially configured to store and perform program commands. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and the technical idea of the present disclosure covers a range in which anyone who has common knowledge in the technical field to which the present disclosure belongs can make various modifications and changes without departing from the substance of the present disclosure claimed by claims below.

What is claimed is:

1. A master User Plane Function (UPF) comprising:
a session control unit configured to control a data session of a particular terminal in response to a data session-related request for data session control, received from a Session Management Function (SMF), related to the data session of the particular terminal;
an information generation unit configured to identify master operation information relating to the data session control at a time of reception at the master UPF from the SMF, wherein the master operation information, identified at the time of reception of the data session-related request for data session control, includes data session information of the data session of the particular terminal, service requirement information and master and slave interconnection information which includes address information of a first slave UPF and next-hop address information of a second slave UPF recognized to be directly connected to the first slave UPF, and the information generation unit is configured to generate particular information based on the identified master operation information, wherein the SMF is to provide the master operation information only to the master UPF; and
a packet transfer unit configured to:
insert the generated particular information, which includes the data session information of the data session of the particular terminal, the service requirement information, the address information of the first slave UPF and the next-hop address information of the second slave UPF, into a header of a data packet received, at the master UPF, through the data session of the particular terminal, and
transfer the data packet having the generated particular information to the first slave UPF that is identified from the master operation information identified at the time of reception of the data session-related request for data session control received at the master UPF from the SMF,
wherein the transferred data packet having the generated particular information is configured to allow the first slave UPF to identically perform data session control of the particular terminal, based on the header of the data packet including the data session information of the data session of the particular terminal and the address information of the first slave UPF, and
wherein the transferred data packet having the generated particular information is configured to allow the second slave UPF to identically perform data session control of the particular terminal, based on the header of the data packet including the data session information of the data session of the particular terminal and the next-hop address information of the second slave UPF.

2. The master UPF of claim 1, wherein the generated particular information is included in the header of the data packet received through the data session of the particular terminal.

3. The master UPF of claim 1, wherein the packet transfer unit is configured to:
insert the generated particular information into the data packet by modifying the header of the data packet, received through the data session of the particular terminal, to include the generated particular information, or additionally insert the generated particular information in the header of the data packet received through the data session; and
transfer the data packet from the master UPF to the first slave UPF through a particular interface defined for signaling between UPFs.

4. The master UPF of claim 1, wherein the master operation information received based on the data session-related request for data session control received from the SMF includes:
the data session information of the data session of the particular terminal according to the data session-related request for data session control received from the SMF,
the service requirement information including at least one of end-to-end information, a packet detection rule (PDR), a forwarding action rule (FAR), a QoS enforcement rule (QER), and a usage reporting rule (URR), and
the master and slave interconnection information.

5. The master UPF of claim 4, wherein the master and slave interconnection information includes information of the first slave UPF to be directly connected to the master UPF.

6. The master UPF of claim 4, wherein the generated particular information includes the data session information, the service requirement information, the master and slave interconnection information, and address information relating to the second slave UPF recognized to be directly connected to the first slave UPF from the master and slave interconnection information.

7. An operation method of a master User Plane Function (UPF), the method comprising:
receiving, from a Session Management Function (SMF), a data session-related request for data session control relating to a data session of a particular terminal;
controlling, at the master UPF, data session of the particular terminal in response to receiving the data session-related request for data session control related to the data session of the particular terminal;
generating particular information based on master operation information relating to the data session control when the data session-related request for data session control is received at the master UPF from the SMF, wherein the master operation information, received with the data session-related request for data session control, includes data session information of the data session of the particular terminal, service requirement information and master and slave interconnection information which includes address information of a first slave UPF and next-hop address information of a second slave UPF recognized to be directly connected to the first slave UPF, wherein the SMF is to provide the master operation only to the master UPF;
receiving, at the master UPF, a data packet through the data session of the particular terminal; and
inserting, at the master UPF, generated particular information, which includes the data session information of the data session of the particular terminal, the service requirement information, the address information of the first slave UPF and the next-hop address information of the second slave UPF, into a header of the data packet received, at the master UPF, through the data session of the particular terminal, and transferring the data packet having the generated particular information to the first slave UPF that is identified from the master operation information received based on the data session-related request for data session control received at the master UPF from the SMF.

8. The method of claim 7, comprising:

receiving, at the first slave UPF, the data packet having the generated particular information in the header; and identically performing, at the first slave UPF, data session control of the particular terminal, based on the header of the data packet including the data session information of the data session of the particular terminal and the address information of the first slave UPF; and transferring, from the first slave UPF, the data packet having the generated particular information in the header to the second slave UPF that is identified from the master operation information received based on the data session-related request for data session control received at the master UPF from the SMF.

9. The method of claim 8, comprising:

receiving, at the second slave UPF, the data packet having the generated particular information in the header; and identically performing, at the second slave UPF, data session control of the particular terminal, based on the header of the data packet including the data session information of the data session of the particular terminal and the next-hop address information of the second slave UPF.

* * * * *